(12) United States Patent
Sriram et al.

(10) Patent No.: US 9,069,706 B2
(45) Date of Patent: Jun. 30, 2015

(54) CONFIDENTIAL INFORMATION PROTECTION SYSTEM AND METHOD

(75) Inventors: Parthasarathy Sriram, Los Altos, CA (US); Gordon Grigor, San Francisco, CA (US); Shu-Jen Fang, Cupertino, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1542 days.

(21) Appl. No.: 12/069,713

(22) Filed: Feb. 11, 2008

(65) Prior Publication Data

US 2009/0205053 A1     Aug. 13, 2009

(51) Int. Cl.
*H04L 9/32* (2006.01)
*H04L 9/00* (2006.01)
*G06F 12/14* (2006.01)
*G06F 21/62* (2013.01)

(52) U.S. Cl.
CPC ........ *G06F 12/1416* (2013.01); *G06F 12/1408* (2013.01); *G06F 21/6218* (2013.01)

(58) Field of Classification Search
CPC ..... G06F 21/10; G06F 21/62; G06F 21/6204; G06F 21/6218; G06F 21/78; G06F 12/1416; G06F 12/1408
USPC ........ 380/270, 277; 713/189–194; 726/26–30
See application file for complete search history.

(56) References Cited

U.S. PATENT DOCUMENTS

| | | |
|---|---|---|
| 5,457,748 A | 10/1995 | Bergum et al. |
| 6,046,676 A | 4/2000 | Ward et al. |
| 6,185,678 B1 | 2/2001 | Arbaugh et al. |
| 6,289,459 B1 | 9/2001 | Fischer et al. |

(Continued)

FOREIGN PATENT DOCUMENTS

| | | |
|---|---|---|
| EP | 0961193 | 12/1999 |
| EP | 1845470 | 10/2007 |

(Continued)

OTHER PUBLICATIONS

Yano Koshio, et al. Hardware-Dependent Softwate-Role of Firmware Study Bootloader from CPU Mechanism/Design of BIOS, Interface, Japan, CQ Publishing Co., Ltd., Jan. 1, 2008 vol. 34, No. 1, p. 95-p. 104.

*Primary Examiner* — Hosuk Song

(57) ABSTRACT

Efficient and effective permission confidential information protection systems and methods are described. The secure information protection systems and methods facilitate storage of confidential information in a manner safe from rogue software access. In one embodiment, a confidential information protection method is implemented in hardware and facilitates protection against software and/or Operating System hacks. In one exemplary implementation, a confidential information protection method includes setting a permission sticky bit flag to a default state upon system set up. The permission sticky bit flag access permission indication is adjusted at system reset in accordance with an initial application instruction. Access to the confidential information is restricted in accordance with the permission sticky bit and the permission sticky bit is protected from adjustments attempting to violate the permission indication. For example, another software application can not access or alter confidential information (e.g., an encryption key, initialization vector, etc.) if a permission sticky bit is designated as the highest security rating (e.g., disabling read permission and write permission until system reset).

20 Claims, 5 Drawing Sheets

100

| Confidential Information 111 | Read Permission Sticky Bit 121 | Write Permission Sticky Bit 131 |
|---|---|---|
| Confidential Information 112 | Read Permission Sticky Bit 122 | Write Permission Sticky Bit 132 |
| Confidential Information 113 | Read Permission Sticky Bit 123 | Write Permission Sticky Bit 133 |
| Confidential Information 114 | Read Permission Sticky Bit 124 | Write Permission Sticky Bit 134 |

(56) References Cited

U.S. PATENT DOCUMENTS

| | | |
|---|---|---|
| 7,592,829 B2 * | 9/2009 | Walmsley et al. ............ 326/8 |
| 8,719,585 B2 | 5/2014 | Grigor et al. |
| 2001/0011347 A1 | 8/2001 | Narayanaswamy et al. |
| 2002/0196159 A1 | 12/2002 | Lesenne et al. |
| 2003/0023822 A1 | 1/2003 | Scott et al. |
| 2003/0056107 A1 | 3/2003 | Cammack et al. |
| 2003/0084337 A1 | 5/2003 | Simionescu et al. |
| 2003/0095664 A1 | 5/2003 | Asano et al. |
| 2003/0115471 A1 | 6/2003 | Skeba |
| 2003/0177373 A1 | 9/2003 | Moyer et al. |
| 2004/0193873 A1 | 9/2004 | England |
| 2005/0081071 A1 * | 4/2005 | Huang et al. ............ 713/300 |
| 2005/0283601 A1 | 12/2005 | Tahan |
| 2005/0289067 A1 | 12/2005 | Lampson et al. |
| 2006/0002561 A1 | 1/2006 | Choi et al. |
| 2006/0136748 A1 | 6/2006 | Bade et al. |
| 2006/0174109 A1 | 8/2006 | Flynn |
| 2006/0174240 A1 | 8/2006 | Flynn |
| 2006/0179308 A1 | 8/2006 | Morgan et al. |
| 2007/0027988 A1 | 2/2007 | Lavin et al. |
| 2007/0055881 A1 | 3/2007 | Fuchs et al. |
| 2007/0083744 A1 | 4/2007 | Seok |
| 2007/0169098 A1 | 7/2007 | Kikuchi |
| 2007/0198851 A1 | 8/2007 | Goto |
| 2007/0217614 A1 | 9/2007 | Fujiwara et al. |
| 2007/0220242 A1 | 9/2007 | Suzuki et al. |
| 2007/0234130 A1 | 10/2007 | Sullivan et al. |
| 2007/0300207 A1 | 12/2007 | Booth et al. |
| 2008/0040598 A1 | 2/2008 | Lee et al. |
| 2008/0077973 A1 | 3/2008 | Zimmer et al. |
| 2008/0082680 A1 | 4/2008 | Grewal et al. |
| 2008/0086630 A1 | 4/2008 | Rodgers et al. |
| 2008/0086652 A1 | 4/2008 | Krieger et al. |
| 2008/0114994 A1 | 5/2008 | Iyer et al. |
| 2008/0137848 A1 | 6/2008 | Kocher et al. |
| 2008/0148001 A1 * | 6/2008 | Gehrmann et al. ............ 711/164 |
| 2008/0165952 A1 | 7/2008 | Smith et al. |
| 2009/0205053 A1 | 8/2009 | Sriram et al. |
| 2009/0259854 A1 | 10/2009 | Cox et al. |
| 2010/0138668 A1 | 6/2010 | Tsuria et al. |
| 2010/0185845 A1 | 7/2010 | Takayama et al. |

FOREIGN PATENT DOCUMENTS

| | | |
|---|---|---|
| GB | 2427720 | 1/2007 |
| JP | 2004530235 | 9/2004 |
| JP | 2005122733 | 5/2005 |
| KR | 2002-90139 | 11/2002 |
| TW | 200306107 | 11/2003 |
| WO | WO02/21763 | 3/2002 |
| WO | 2006086301 | 8/2006 |
| WO | 2008009112 | 1/2008 |
| WO | WO2008/071572 | 6/2008 |

* cited by examiner

100

| | | |
|---|---|---|
| Confidential Information 111 | Read Permission Sticky Bit 121 | Write Permission Sticky Bit 131 |
| Confidential Information 112 | Read Permission Sticky Bit 122 | Write Permission Sticky Bit 132 |
| Confidential Information 113 | Read Permission Sticky Bit 123 | Write Permission Sticky Bit 133 |
| Confidential Information 114 | Read Permission Sticky Bit 124 | Write Permission Sticky Bit 134 |

| Confidential Information 171 | Read Permission Sticky Bit 181 | Write Permission Sticky Bit 191 |
|---|---|---|
| Confidential Information 172 | | |
| Confidential Information 173 | Read Permission Sticky Bit 183 | Write Permission Sticky Bit 193 |
| Confidential Information 174 | | |

210
Setting a permission sticky bit flag to a default state upon set up.

220
Adjusting said permission sticky bit flag access permission indication in accordance with an application instruction

230
Protecting said permission sticky bit from adjustment in violation of said permission indication.

FIG 2

CONFIDENTIAL INFORMATION PROTECTION SYSTEM AND METHOD

FIELD OF THE INVENTION

The present invention relates to the field of information protection. More particularly, the present invention relates to a system and method for effective access permission sticky bit protection.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve processing sensitive information. However, adequately protecting the sensitive information can be problematic.

Conventional attempts at protecting information often involve encryption. While conventional encryption/decryption attempts can provide a degree of protection, the protection is often limited to the security of the key utilized in encryption and decryption operations. Traditional approaches are often susceptible to unauthorized access to or hacking of the key values.

Some traditional approaches attempt to lock internal memory regions and refer to the locked regions as secure for storage of confidential or sensitive information. The traditional approaches typically rely on the Operating System to switch between secure and non-secure regions. However, conventional locked internal memory storage techniques are often susceptible to unauthorized and/or nefarious intrusion. For example, confidential information stored in conventional internal memories is often susceptible to hacking by either rogue software applications and/or Operating System loopholes resulting in the confidential information no longer being secure.

SUMMARY

Efficient and effective permission confidential information protection systems and methods are described. The secure information protection systems and methods facilitate storage of confidential information in a manner safe from rogue software access. In one embodiment, a confidential information protection method is implemented in hardware and facilitates protection against software and/or Operating System hacks. In one exemplary implementation, a confidential information protection method includes setting a permission sticky bit flag to a default state upon system set up. The permission sticky bit flag access permission indication is adjusted at system reset in accordance with an initial application instruction. Access to the confidential information is restricted in accordance with the permission sticky bit and the permission sticky bit is protected from adjustments attempting to violate the permission indication. For example, another software application can not access or alter confidential information (e.g., an encryption key, initialization vector, etc.) if a permission sticky bit is designated as the highest security rating (e.g., disabling read permission and write permission until system reset).

DESCRIPTION OF THE DRAWINGS

The accompanying drawings, which are incorporated in and form a part of this specification, are included for exemplary illustration of the principles of the present and invention and not intended to limit the present invention to the particular implementations illustrated therein. The drawings are not to scale unless otherwise specifically indicated.

FIG. 1A is a block diagram of an exemplary confidential information protection scheme in accordance with one embodiment of the present invention.

FIG. 1B is a block diagram of another exemplary confidential information protection scheme in accordance with one embodiment of the present invention.

FIG. 2 is a block diagram of an exemplary confidential information protection method in accordance with one embodiment of the present invention.

DETAILED DESCRIPTION

Figure 3:
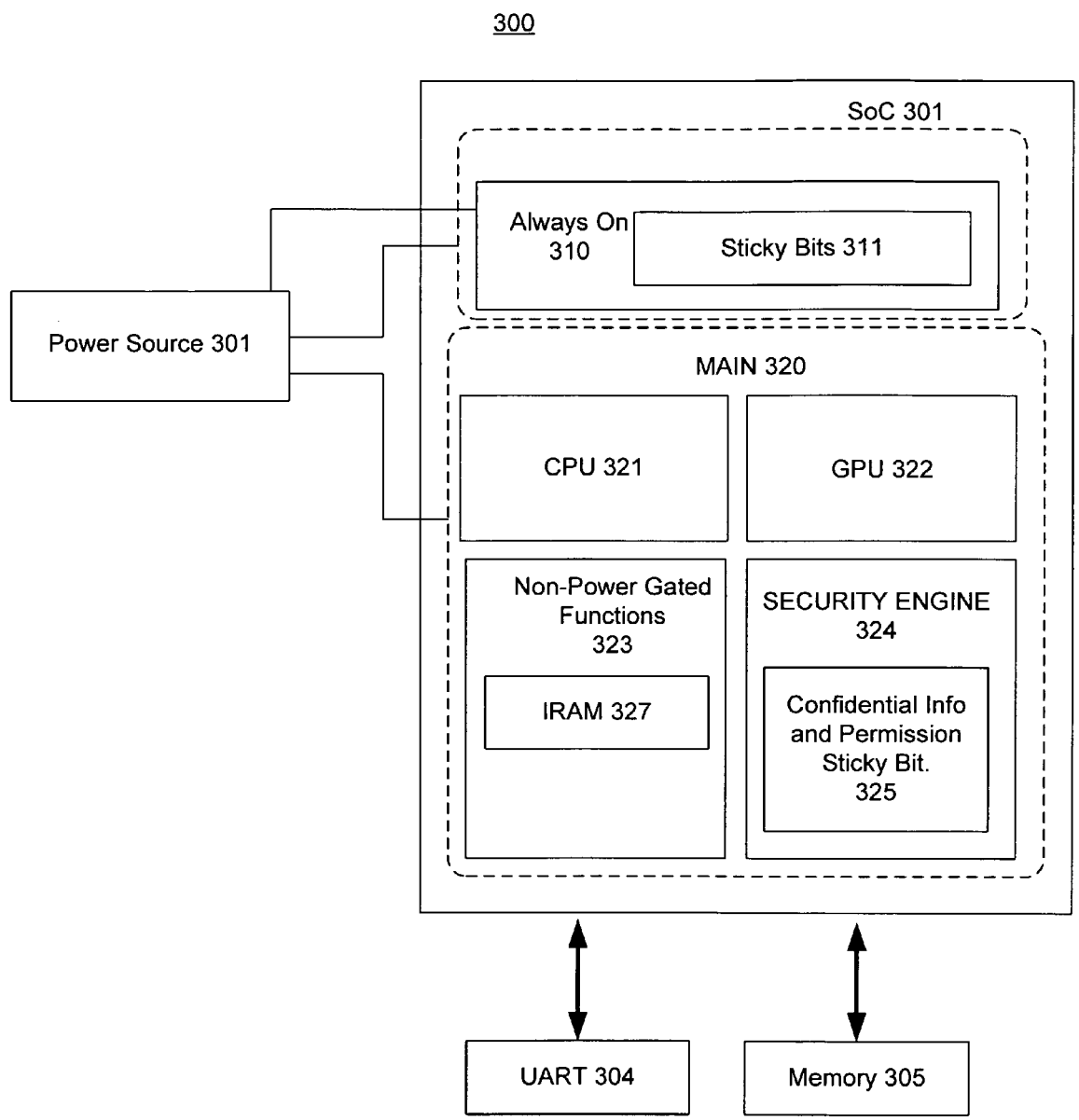
FIG. 3 is a block diagram of an exemplary system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention facilitates effective and secure information protection. In one embodiment, the present invention directs secure setting and protection of confidential information and permission sticky bits. The permission sticky bits are set by an information creator during a system reset and secure settings can not be altered until the next system reset process. In one exemplary implementation, software applications are prevented from accessing and/or altering a permission sticky bit after system reset. In one embodiment, a sticky bit permission indicator is flexibly set initially by a software application at system reset and thereafter the sticky bit setting and corresponding confidential information are secured by hardware based protection mechanisms in accordance with the initial settings. If the initial sticky bit permission disables read and write permission, hardware protects both the sticky bit and confidential information from access by software and/or operating systems intrusion or hacking FIG. 1A is a block diagram of an exemplary confidential information protection scheme 100 in accordance with one embodiment of the present invention. Confidential information protection scheme 100 includes confidential information 111, 112, 113 and 114, read permission sticky bits 121, 122, 123, and 124, and write permission sticky bits 131, 132,133 and 134. Read sticky bit 121 and write sticky bit permission bit 131 are associated with confidential information 111. Read sticky bit 122 and write sticky bit permission bit 132 are associated with confidential information 112. Read sticky bit 123 and write sticky bit permission bit 133 are associated with confidential information 113. Read sticky bit 124 and write sticky bit permission bit 134 are associated with confidential information 114.

It is appreciated that a variety of different types of confidential information can be associated with the permission sticky bits. In one embodiment, the confidential information includes encryption/decryption keys. In one exemplary implementation the confidential information includes initialization vectors.

It is appreciated that access permission sticky bit assignment can be partitioned into groups or regions. FIG. 1B is a block diagram of an exemplary confidential information protection scheme 190 in accordance with one embodiment of the present invention. Confidential information protection scheme 190 includes confidential information 171, 172, 173 and 174, read permission sticky bits 181, and 184, and write permission sticky bits 191 and 193. Confidential information protection scheme 190 is similar to confidential information protection scheme 100 except access permission is partitioned and access indications are assigned to a plurality of discrete confidential information as a group. In one exemplary implementation, the access permission is partitioned into a secure partition (e.g., 171 and 172) and non-secure partition (e.g., 173 and 174). The secure partition is granted read permission in accordance with permission sticky bit 181 and write permission sticky bit 191. The secure partition is granted read permission in accordance with permission sticky bit 183 and write permission sticky bit 193.

FIG. 2 is a block diagram of exemplary confidential information protection method 200 in accordance with one embodiment of the present invention. In one embodiment of exemplary confidential information protection method 200 is applied to permission sticky bits associated with an encryption key and an initialization vector.

In block 210, a permission sticky bit flag is set to a default state upon system set up or reset. In one embodiment the default state is full read permission or the default state is full write permission. The permission sticky bit is set to a logical value indicating corresponding permission. By way of example, the permission sticky bit can be set to a logical 1 to indicate a read permission and/or write permission or a logical zero to indicate a read permission and/or write permission is not available or granted. In one exemplary implementation, permission sticky bits associated with a key table entry and initialization vector are cleared before the default is set.

In block 220, the permission sticky bit flag access permission indication is adjusted to an initial setting in accordance with an application instruction at system reset. In one embodiment, a permission sticky bit that is set to a default permit access (e.g., read or write) in block 210 is altered (e.g., changed to an initial setting) to prohibit access in block 220. In one exemplary implementation, the access permission indication can correspond to a read permission or a write permission.

In one embodiment, the information creator indicates the level of security associated with the information and sets the initial security levels appropriately (e.g., in block 210 at system reset). In one exemplary implementation, the initial security level settings of the permission sticky bits is hardware managed and hence not susceptible to hacking of the Operating System or alteration (e.g., retracting the setting, etc.) by rogue information. Even the software associated with the secure information creator can no longer retract initial security settings that deny read access and/or write access. Hence, while allowing flexible initial permission setting, the present scheme provides a very high level of security for subsequent operations.

In block 230, the permission sticky bit is protected from adjustment in violation of the permission indication. If a permission sticky bit is changed to prohibit access at a system reset the permission sticky bit indication can not be altered by software again until another system reset. In one embodiment, access to the permission indication sticky bits is restricted to hardware engines after initial setting in step 210 and protected from software or Operating System alteration. In addition, since the permission sticky bit is cleared upon a system reset, a rogue application may attempt to reset an individual module but since it is not a system reset (e.g., whole SoC reset, etc.) the information permission sticky bit is not cleared and the information is protected. In one exemplary implementation, the hardware engine is built for a specific functionality and the confidential information is protected from utilization beyond the initial permission setting of the sticky bits.

It is appreciated that the confidential information protection method 200 can be applied to systems that include multiple processors. In one embodiment, the protection restrictions are applicable to a plurality of processors. For example, the protection restrictions can be applicable to central processing unit, graphics processing unit, audio-video processor, etc.

FIG. 3 is an exemplary block diagram of system 300 in accordance with one embodiment of the present invention. System 300 includes system-on-a-chip 301, power source 303 (e.g., power cell, battery, connection to a continuous or utility power, etc.), memory 304 and UART 305. The system-on-a-chip 301 includes always on power domain 310 and main power domain 320. The main power domain 320 includes CPU 321, GPU 322, security engine module 324, and non-power gated components 323. It is appreciated system 300 can include a plurality of processors (e.g., CPU 321, GPU 322, an audio video processor, etc.).

The components or system 300 cooperatively operate to implement efficient and effective protection of confidential information utilizing permission sticky bits. Power source 301 supplies power. Always on domain 310 primarily stores information associated with power states of components and initiates of an expedited recovery from a reduced power state. Main domain is a power domain for other components of system 300. Central processing unit CPU 321 and graphics processing unit (GPU) 322 process information. Security engine module 324 performs operations associated with confidential and secure information in accordance with permission sticky bit indications. Non-power gated island 324 includes a variety of components for performing a variety of operations. Non-power gated island 324 can include a cache memory, memory controller, interrupt controller, peripheral controller, etc. Universal Asynchronous Receiver and Transmitter (UART) 304 is a communication interface. External memory 305 stores information.

In one embodiment, an information security block protects secure information utilizing secure access permission sticky bits. It is appreciated that various components of system 300 can utilize present permission sticky bit schemes to protect confidential information. For example, security engine 324 limits access to confidential information (e.g., encryption/decryption keys, initialization vectors, etc.) in accordance permission sticky bits 325. In one embodiment, the indication of permission sticky bits 325 is retrieved from IRAM 327 on a system reset. In one embodiment, the hardware of the security engine can access and change the initialization vector regardless of the access permission sticky bit indication while protecting the information from un-permitted access by software applications. It is appreciate that the security engine 324 can by implemented to perform a variety of confidential and security related operations including encryption and decryption (e.g., AES, DES, 3DES, etc.). It is also appreciated that present protection schemes are readily adaptable for utilization in a variety of components. In one exemplary implementation, always on component 310 can also store confidential information that is protected by permission sticky bits 311.

In one embodiment, a hardware engine has access to the confidential information, even at higher security levels and the confidential information can be use d by said hardware engine according to the usage the hardware engine is designed for including maintaining states. In one exemplary implementation a sticky bit can be utilized to lock a secure engine disable bit and no access is granted to the secure engine. If the system detects or receives and indication there is an attempt to hack the secure engine, a secure engine disable sticky bit is asserted and the secure engine can not be access again until a system reset.

In one embodiment, an initialization vector (IV) is not unique. There is an original that the application uses at the beginning and then there is an IV that gets updated after every iteration. The security or permission sticky bit indications are defined for both them independently.

Figure 4:
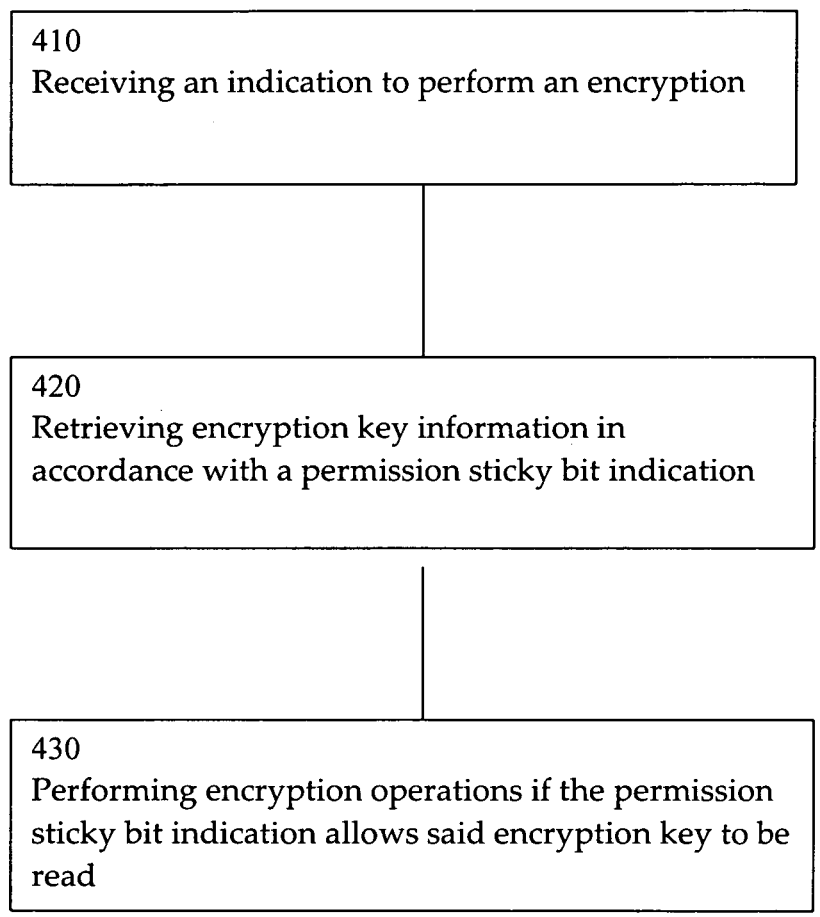
FIG. 4 is a block diagram of an exemplary secure encryption method in accordance with one embodiment of the present invention.

FIG. 4 is a block diagram of exemplary secure encryption method 400 in accordance with one embodiment of the present invention. In block 410 an indication to perform an encryption is received. In block 420 encryption key information is retrieved in accordance with a permission sticky bit indication. In block 430 encryption operations are performed if said permission sticky bit indication allows said encryption key to be read.

In one embodiment there are four security related contexts. In one exemplary implementation, the security related context includes input data pointer, output data pointer (for memory to memory), a security key and initialization vector (IV). In one exemplary implementation, a cooperative context switch is performed and data pointers are handled appropriately while the security engine takes care of the keys and IV. Keys that are fixed between vectors for the same context can be easily handled. For modes other than ECB, an initialization vector is updated on a vector basis. It can be either the previous cipher text vector or clear text vector. At the time of a context switch the initialization vectors can be handled in a variety of ways. A security driver can handle re-initializing the IV. The security engine can automatically save the IV internally and restore it when needed again. The security engine can also keep an internal copy of the first IV and the last IV.

It is appreciated that an IV for secure keys can be handled in utilizing a variety of techniques. In one embodiment, the IV is kept updated locally in scratch registers. During context switching, the IV register value is cleared. To reach the same state, the security engine does not decrypt the previous data and reach the current state. In another embodiment, a copy of the first IV and the updated IV is kept. At the time of switching back to a context, the software can choose which IV to use. The security engine maintains both the IV's. In one exemplary implementation, it is not possible for software to update the IV's when a secure IV update disable sticky bit is cleared.

In one embodiment, sticky bit values are "reset" during the system reset and can be set at any time a system desires. Any software application that wants to protect information puts it in the confidential information location and protects it in accordance with the sticky bits. In one exemplary implementation, other software applications can decide to protect its information, when they are invoked from the user to do so.

Thus, the present invention facilitates enhanced information protection. Access to confidential information is protected in accordance with secure permission sticky bit indications. In one embodiment, hardware protects the permission sticky bit indicators from unauthorized alteration by rogue software applications and/or hacked Operating Systems. The permission sticky bit indications are secure and restrictive permissions can not be altered by unauthorized software attempts during normal operations after being set at system reset. The information is protected while allowing the information creator a significant degree of flexibility in setting initial permission indications. If an information creator indicates confidential information is to be protected in accordance with a high restriction (e.g., read and write permission disabled or denied) then the information and permission sticky bit are not accessible by hacking software or even the application that indicated the initial permission sticky bit setting. The present permission sticky bit scheme also facilitates a variety of security partitions and organizational groupings at different levels of granularity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A confidential information protection method comprising:
    setting a permission sticky bit flag in a non-transient computer readable storage media to a default state upon system set up;
    adjusting said permission sticky bit flag access permission indication in accordance with an application instruction at system reset;
    protecting said permission sticky bit flag from adjustment in violation of said access permission indication, wherein if said access permission indication is set to prohibit access said permission sticky bit flag can not be altered again until another system set up or reset.

2. The confidential information protection method of claim 1 wherein said permission sticky bit flag indicates access permission to an encryption key.

3. The confidential information protection method of claim 1 wherein said permission sticky bit flat indicates access permission to an initialization vector, wherein said initialization vector is not unique, a first initialization vector is an original that an application uses at the beginning and a second initialization vector gets updated after every iteration, wherein permission sticky bit indications are defined for both of them independently.

4. The confidential information protection method of claim 1 wherein said access permission indication corresponds to a read permission.

5. The confidential information protection method of claim 1 wherein said access permission indication corresponds to a write permission.

6. The confidential information protection method of claim 1 wherein said default state is full read permission.

7. The confidential information protection method of claim 1 wherein said default state is full write permission.

8. The confidential information protection method of claim 1 wherein setting a permission sticky bit flag to a default state is performed upon a system on chip reset but a simple module reset has no affect on the permission sticky bits.

9. The confidential information protection method of claim 1 further comprising clearing a key table entry associated with said permission sticky bit.

10. The confidential information protection method of claim 1 further comprising clearing an initialization vector associated with said permission sticky bit.

11. An information protection system comprising:
    a processor for processing information;
    a memory for storing said information; and
    an information security block for protecting secure information utilizing secure access permission sticky bits, wherein said secure access permission sticky bits are set during a system setup or reset and settings associate with said secure access permission sticky bits can not be altered until a subsequent system setup or reset.

12. The information protection system of claim 11 wherein said information block includes an encryption and decryption component for encrypting and decrypting said information.

13. The information protection system of claim 11 wherein said permission sticky bit indicates access permission to an encryption key.

14. The information protection system of claim 11 wherein said permission sticky bit indicates access permission to an initialization vector.

15. The information protection system of claim 11 wherein said permission sticky bit is cleared and altered on a system on chip reset.

16. The information protection system of claim 11 wherein a hardware engine has access to the confidential information, even at higher security levels and the confidential information can be used by said hardware engine according to the usage the hardware engine is designed for including maintaining states.

17. A secure encryption method comprising:
    receiving an indication to perform an encryption;
    retrieving encryption key information in accordance with a permission sticky bit indication in a non-transient computer readable media, wherein said permission sticky bit flag is protected from adjustment in violation of an access permission indication, and wherein if said access permission indication is set to prohibit access said permission sticky bit flag can not be altered again until another system set up or reset; and
    performing encryption operations if said permission sticky bit indication allows said encryption key to be read.

18. The secure encryption method of claim 17 wherein said access permission is partitioned and assigned indication is assign to a plurality of sticky bits.

19. The secure encryption method of claim 17 wherein said access permission is partitioned into a secure partition and non-secure partition.

20. The secure encryption method of 17 wherein said secure partition has more permission sticky bits than said non-secure partition.

* * * * *